UNITED STATES PATENT OFFICE.

WILLIAM KIEL, OF BUTLER, NEW JERSEY.

VULCANIZED PLASTIC COMPOUND.

SPECIFICATION forming part of Letters Patent No. 393,838, dated December 4, 1888.

Application filed August 21, 1888. Serial No. 283,367. (No specimens.)

*To all whom it may concern:*

Be it known that I, WILLIAM KIEL, a citizen of the United States, residing at Butler, in the county of Morris, in the State of New Jersey, have invented a certain Improvement in Vulcanized Plastic Compounds.

This compound is especially adapted to the manufacture of vessels, receptacles, or other articles used for chemical or electrical purposes, and also of articles now made of rubber or other plastic materials.

The following is a full, clear, and exact description of my invention.

My composition consists of the following ingredients: india-rubber, sulphur, and pumice-stone, to which I usually and preferably add oil and beeswax. The exact proportions of the ingredients used in the manufacture of my composition are not invariable, for the reason that the proportions and quantities vary with the quality of greater or less elasticity of the material to be produced. For articles where elasticity is required I use a smaller quantity of pumice-stone. Where less elasticity is necessary I use a larger quantity of pumice-stone, in the proportions indicated below. I prefer to use crude rubber which has been washed only, as it is better adapted to the purpose than rubber which has been passed between hot rollers.

The quantity of pumice-stone to be used varies in weight from one to five times the weight of the crude rubber. I find that it is not practical to use less than even parts of pumice-stone and crude rubber or more than five times as much pumice-stone as rubber. The quantity of the other ingredients varies according to the quantity of pumice-stone and the quality of the rubber.

Less sulphur is needed with inferior rubber.

I use a quantity of sulphur equal to one-half of the weight of pumice-stone when the minimum quantity of pumice-stone is used, oil equal to one-fifth, and beeswax equal to one-twentieth of the weight of the minimum quantity of pumice-stone. Thus, for example, with ten pounds of pumice-stone to ten pounds of crude rubber of ordinary fair grade I find the bests results obtainable by using five pounds of sulphur with two pounds of oil and one-half pound of beeswax.

The quantity of sulphur used increases with the quantity of pumice-stone and at the rate of one-tenth of the quantity of sulphur for each additional part of pumice-stone; but I find it preferable when using the maximum proportion of pumice-stone to use twice the proportionate weight of sulphur used with the minimum quantity of pumice-stone.

The quantity of oil (in weight) used is equal to one-fifth of that of pumice-stone. The quantity of beeswax (in weight) varies from 0.006 of the quantity of pumice-stone when the minimum quantity of pumice-stone is used to 0.01 of the quantity of pumice-stone when the maximum quantity is used.

I find it useful to mix powdered hard rubber with the other ingredients in quantity equal or less to the quantity of sulphur used; but this is not necessary.

The solid ingredients other than the crude india-rubber are to be finely powdered and mixed together with the liquids. They are then, with the rubber, to be rolled between heated rollers until the various ingredients are thoroughly incorporated with each other in a manner similar to that employed in the manufacture of hard rubber. The compound is then ready to be put in molds or otherwise treated to produce any desired form, and then vulcanized, the heat in that process varying according to the nature of the article molded or the use to which it is to be put.

This compound should have in vulcanization a pressure of from fifty to sixty pounds during a space of from ten to fourteen hours, according to the quantity of pumice-stone used. I find it preferable to gradually increase the pressure instead of using the highest pressure immediately. The compound must be kept in the vulcanizer not less than ten or more than fourteen hours. The best results are produced with a lower pressure and longer vulcanization.

I have above described my new compound as made of india-rubber, sulphur, pumice-stone, oil, and beeswax; but it will be understood that other equivalent ingredients may be substituted for the oil and beeswax, or both, or under certain conditions such ingredients may be omitted, the principal feature of novelty and value in my composition being the use of pumice-stone in a vulcanizable compound as giving thereto new and valuable properties.

I have found that by mixing pumice-stone with the ingredients constituting hard rubber a change takes place in the resulting material during the process of vulcanization which is different from the change occurring during the vulcanization of hard rubber and its other compounds, and by it an article is produced which, while it has the same hardness as hard rubber, possesses a superior elasticity and toughness and resulting greater strength—qualities which, as far as I know, no known ingredient other than pumice-stone imparts to vulcanized plastic compounds. In the manufacture of hard rubber it is a well-known fact that hard rubber cannot be vulcanized at one time in thicknesses of over three-quarters of an inch. By using my invention I can at one time vulcanize my material of at least two and a half inches in thickness at one operation without difficulty and without failure.

The advantages of my invention over ordinary hard rubber and other known vulcanized plastic compounds are that it is easier to work than hard rubber or other compounds and is less likely to ignite during the process of manufacture than hard rubber and its compounds, and generally the process of manufacture of my compound is greatly facilitated by the use of pumice-stone. It is not affected by the most intense cold. It will stand a very high temperature, much higher than hard rubber itself. It burns with difficulty. Its ingredients mix faster and more uniformly than those of other compounds or even hard rubber itself. It is a tough, elastic, and hard material capable of resisting blows which would crush, destroy, or fracture articles made of other vulcanized plastic compounds. It is non-porous, and therefore well adapted to be made into vessels or receptacles to be used for holding fluids, and in particular it is adapted to the manufacture of receptacles for holding acids, as it is capable of resisting their attacks and those of other corrosive substances. It is a perfect insulating material, and in insulating properties is superior to any other vulcanized plastic compound that I know of, and even superior to hard rubber in practical use, as it is more durable than the latter substance. Furthermore, it is cheaper, and for that reason articles made of it can be used where hard rubber and other vulcanized plastic compounds as now manufactured cannot be applied by reason of their cost. It can with success be made into nearly every kind of article for which hard rubber is now used.

So far as I know, none of the vulcanized plastic compounds now in use have the certain qualities possessed by my compound, and value for the manufacture of receptacles or vessels and generally for insulating purposes, for the reason that such compounds are apt to be either too brittle or too porous, or are fusible at too low a temperature. Vessels made of my compound and intended to be used for chemical purposes are also more capable of resisting the attacks of acids and of preventing the percolation of liquids through them when such liquids are confined therein for any length of time. My compound is also better adapted for the manufacture of vessels or other articles which are likely to be subjected to violent shocks or sudden jars, (like a storage-battery on a railroad-train,) for the reason that it is less brittle than any other plastic compound.

I do not intend to limit the use of this compound to the manufacture of the particular articles for electrical or chemical purposes, nor do I confine myself to the proportions herein indicated, but may vary them as circumstances may require, but merely name them to give the best results of my experiments.

I do not claim in this application any special articles of manufacture made from my compound—such as, for instance, a receptacle for holding acids to be used as a battery-cell or other similar purposes, and tubes or similar articles made of my material for insulating electrical wires and conductors for electrical subways or other purposes—as such special articles are the subject of separate applications for patents made by me.

What I claim, and desire to secure by Letters Patent, is—

1. The herein-described composition of matter, consisting of pumice-stone, india-rubber, and sulphur united by vulcanization, substantially as described.

2. The herein-described composition of matter, consisting of pumice-stone, india-rubber, sulphur, oil, and beeswax united by vulcanization, substantially as described.

WILLIAM KIEL.

Witnesses:
 THOS. G. BARTON,
 A. H. NONES.